United States Patent
Ramaratnam et al.

(10) Patent No.: US 10,176,501 B2
(45) Date of Patent: Jan. 8, 2019

(54) SYSTEMS AND METHODS FOR SALE REDEMPTION

(71) Applicant: Wal-Mart Stores, Inc., Bentonville, AR (US)

(72) Inventors: Arjun Ramaratnam, Fremont, CA (US); Ashish Chaphekar, Milpitas, CA (US); SriKrishna Chitturi, Union City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 593 days.

(21) Appl. No.: 14/516,291

(22) Filed: Oct. 16, 2014

(65) Prior Publication Data

US 2016/0110785 A1    Apr. 21, 2016

(51) Int. Cl.
  *G06Q 30/00* (2012.01)
  *G06Q 30/06* (2012.01)
  *G06Q 10/08* (2012.01)

(52) U.S. Cl.
  CPC ....... *G06Q 30/0609* (2013.01); *G06Q 10/087* (2013.01); *G06Q 30/012* (2013.01); *G06Q 30/0633* (2013.01)

(58) Field of Classification Search
  None
  See application file for complete search history.

(56) References Cited

U.S. PATENT DOCUMENTS

| | | | |
|---|---|---|---|
| 6,754,636 B1 * | 6/2004 | Walker | G06Q 20/00 705/14.26 |
| 7,158,948 B1 | 1/2007 | Rodriguez et al. | |
| 7,197,481 B1 | 3/2007 | Yamamoto et al. | |
| 8,065,191 B2 * | 11/2011 | Senior | G06Q 20/203 705/14.39 |
| 8,401,914 B1 | 3/2013 | Kim | |
| 8,478,696 B2 * | 7/2013 | Rosskamm | G06Q 10/20 705/302 |
| 8,560,401 B1 * | 10/2013 | Bharara | G06Q 30/00 705/26.1 |
| 2003/0171996 A1 | 9/2003 | Chen et al. | |
| 2003/0233277 A1 | 12/2003 | Saunders et al. | |
| 2005/0240492 A1 | 10/2005 | Grdina | |
| 2005/0246230 A1 | 11/2005 | Murray | |
| 2007/0187495 A1 * | 8/2007 | Mullins | G06Q 30/02 235/383 |
| 2008/0133350 A1 * | 6/2008 | White | G06Q 20/06 705/14.27 |

(Continued)

OTHER PUBLICATIONS

Ryan Adams, "I have been locked out from entering codes or using rewards coupons on sears.com", Nov. 1, 2013, (https://www.shopyourway.com/questions/211696).*

(Continued)

*Primary Examiner* — Naeem U Haq
*Assistant Examiner* — Norman Donald Sutch, Jr.
(74) *Attorney, Agent, or Firm* — Bryan Cave Leighton Paisner LLP (57) ABSTRACT

Systems and methods for guaranteed redemption of sale items. The systems and methods can include a payment system for issuing a payment instrument to a customer when the sale item is not available in a retail location. The systems and methods can further include a redemption system for redeeming the payment instrument for the sale item.

20 Claims, 6 Drawing Sheets

(56) References Cited

U.S. PATENT DOCUMENTS

| | | | |
|---|---|---|---|
| 2009/0125411 A1* | 5/2009 | Otto | G06Q 20/16 |
| | | | 705/34 |
| 2009/0132381 A1 | 5/2009 | Gangi | |
| 2010/0078474 A1 | 4/2010 | Rosenblatt et al. | |
| 2012/0203572 A1* | 8/2012 | Christensen | G06Q 30/02 |
| | | | 705/3 |
| 2013/0060635 A1* | 3/2013 | Walker | H04W 4/206 |
| | | | 705/14.58 |
| 2013/0144757 A1* | 6/2013 | Bauer | G06K 7/0008 |
| | | | 705/26.61 |
| 2014/0279238 A1* | 9/2014 | Jones | G06Q 30/0617 |
| | | | 705/26.43 |
| 2015/0120419 A1 | 4/2015 | Byland et al. | |

OTHER PUBLICATIONS

Audible.com, "Audible Redeem Your Promotional Code Webpage", Sep. 6, 2014, (https://web.archive.org/web/20140906043921/https://www.audible.com/at/redeem).*

Oxford English Dictionary,"rain check", Feb. 20, 2018, (http://www.oed.com/view/Entry/269412?redirectedFrom=rain+check#eid).*

Judicial Education Center—University of New Mexico, "Elements of a Contract", Mar. 21, 2014, jec.unm.edu (http://jec.unm.edu/education/online-training/contract-law-tutorial/contract-fundamentals-part-2) (Year: 2014).*

Cassie, "Do You Get Rain Checks? You Should!", Nov. 10, 2011, thethriftycouple.com (https://thethriftycouple.com/do-you-get-rain-checks-you-should/) (Year: 2011).*

\* cited by examiner

SYSTEMS AND METHODS FOR SALE REDEMPTION

TECHNICAL FIELD

This disclosure relates generally to sale redemption systems and methods, and relates more particularly to providing sale items when a sale item is not available in a retail location.

BACKGROUND

A sale item may not be available or in stock due to high demand during a limited time sale. A company can issue a rain check or another coupon which honors the sale price of the item in the future. However, in many cases, a rain check may not guarantee that the sale item will be available in a timely fashion or before a certain date. Other systems, such as layaway and price matching, may not guarantee a price or availability date for a customer.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a system comprising a payment system and a redemption system. In some embodiments, the payment system can be configured to issue a payment instrument for a sale item to a customer, provide an access code associated with the payment instrument, and associate the sale item with the access code. In many embodiments, the sale item is not in stock at the retail location. In some embodiments, the redemption system can be configured to redeem the payment instrument, validate the access code, and add the sale item to a batch order at a distribution center. The redemption system can further provide an estimated delivery date for delivery of the sale item and provide a delivery site for delivery of the sale item. In many embodiments, the redemption system can provide the estimated delivery date for delivery of the sale item and/or provide the delivery site for delivery of the sale item to the customer.

Other embodiments include a method comprising implementing a payment system and implementing a redemption system. In some embodiments, the method further comprises implementing the payment system to issue a payment instrument for a sale item to a customer, provide an access code associated with the payment instrument, and associate the sale item with the access code, wherein the sale item is not in stock at a retail location. In some embodiments, the method further comprises implementing a redemption system to redeem the payment instrument, validate the access code, and add the sale item to a batch order at a distribution center. The method can further include implementing the redemption system to provide an estimated delivery date for delivery of the sale item and provide a delivery site for delivery of the sale item.

In many embodiments, the systems and methods for sale redemption can include systems and methods for redeeming sale items such as those disclosed in Systems and Methods for Providing Sale items, U.S. patent application Ser. No. 14/063,563, filed on Oct. 25, 2013, which is incorporated by reference herein.

Figure 1:
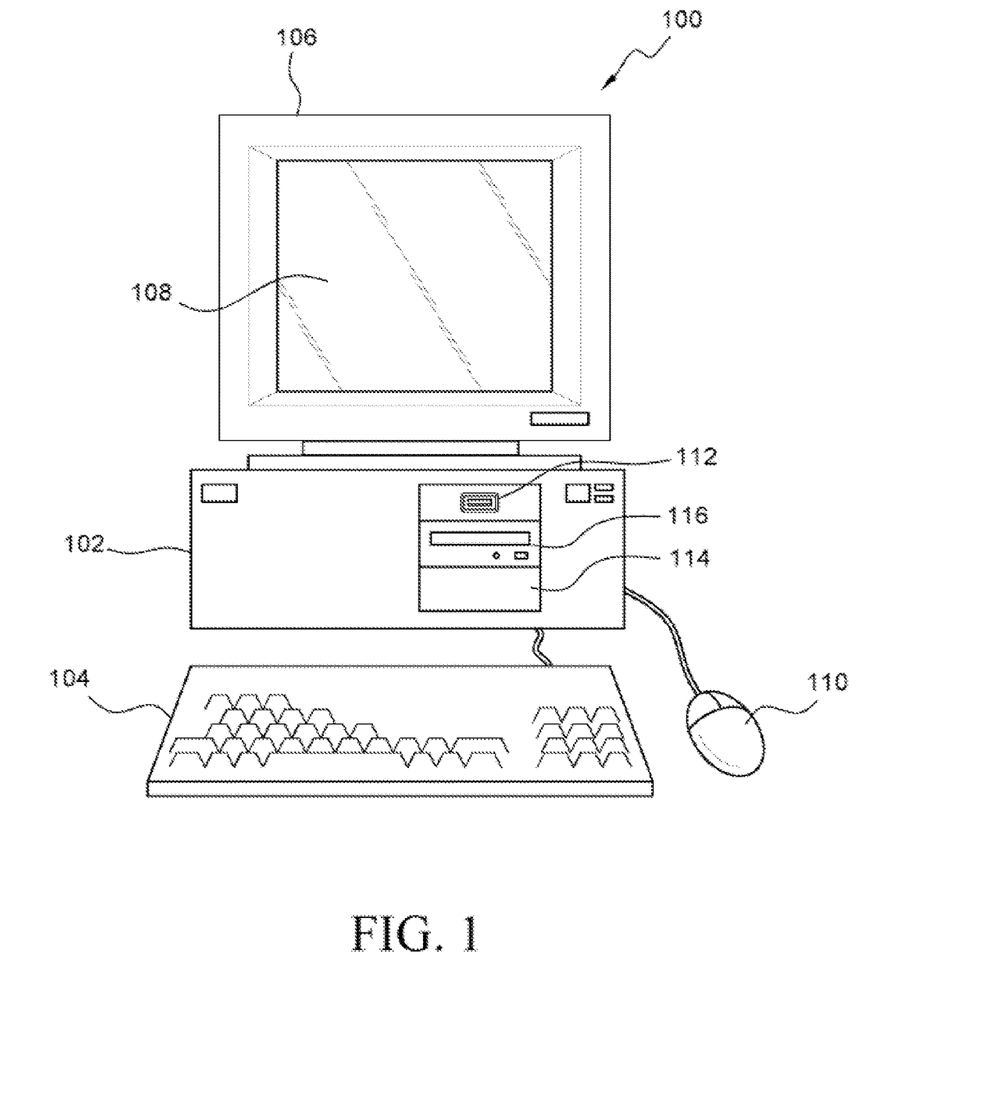
FIG. 1 illustrates a front elevational view of a computer system that is suitable for implementing an embodiment of the system disclosed in FIG. 3.
Figure 2:
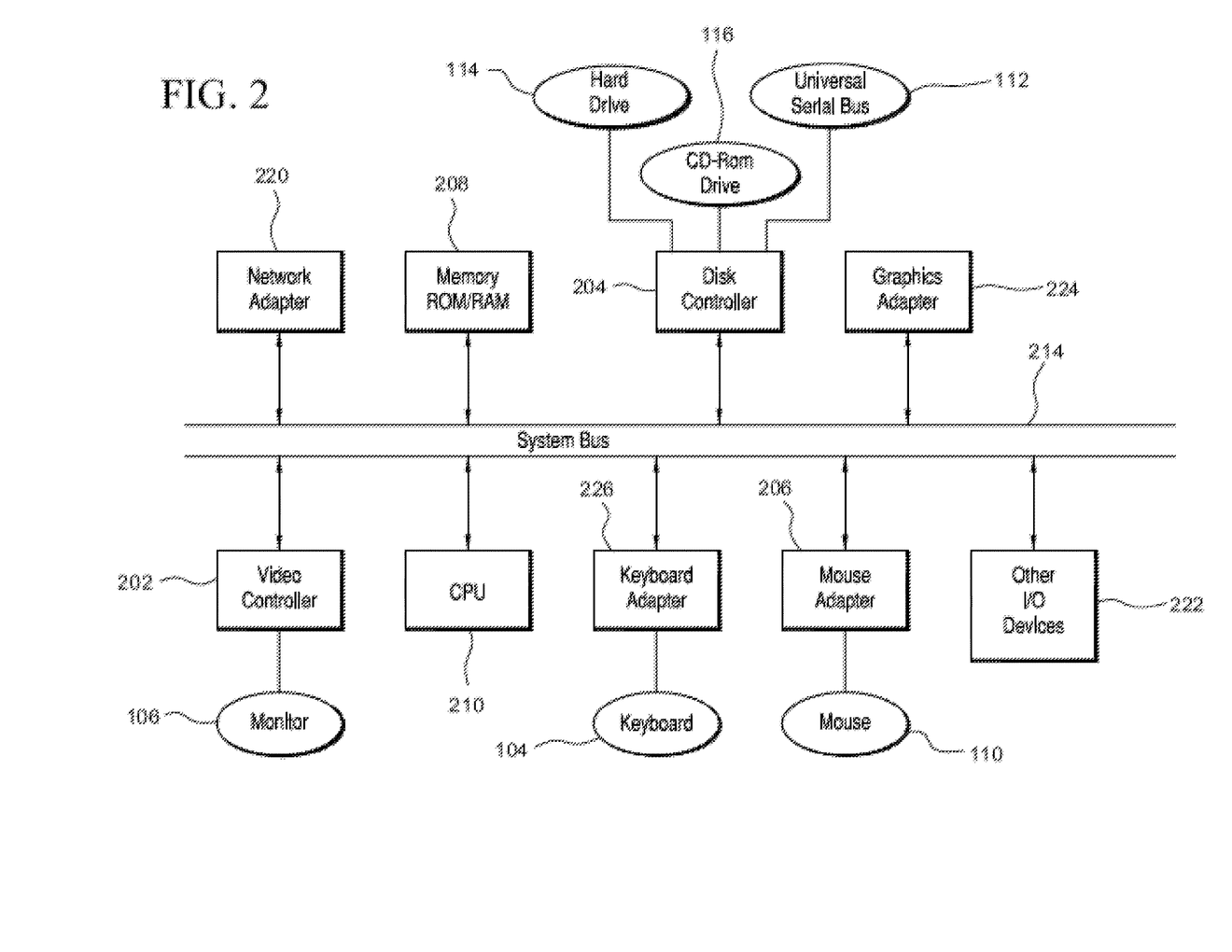
FIG. 2 illustrates a representative block diagram of an example of the elements included in the circuit boards inside a chassis of the computer system of FIG. 1.
Figure 3:
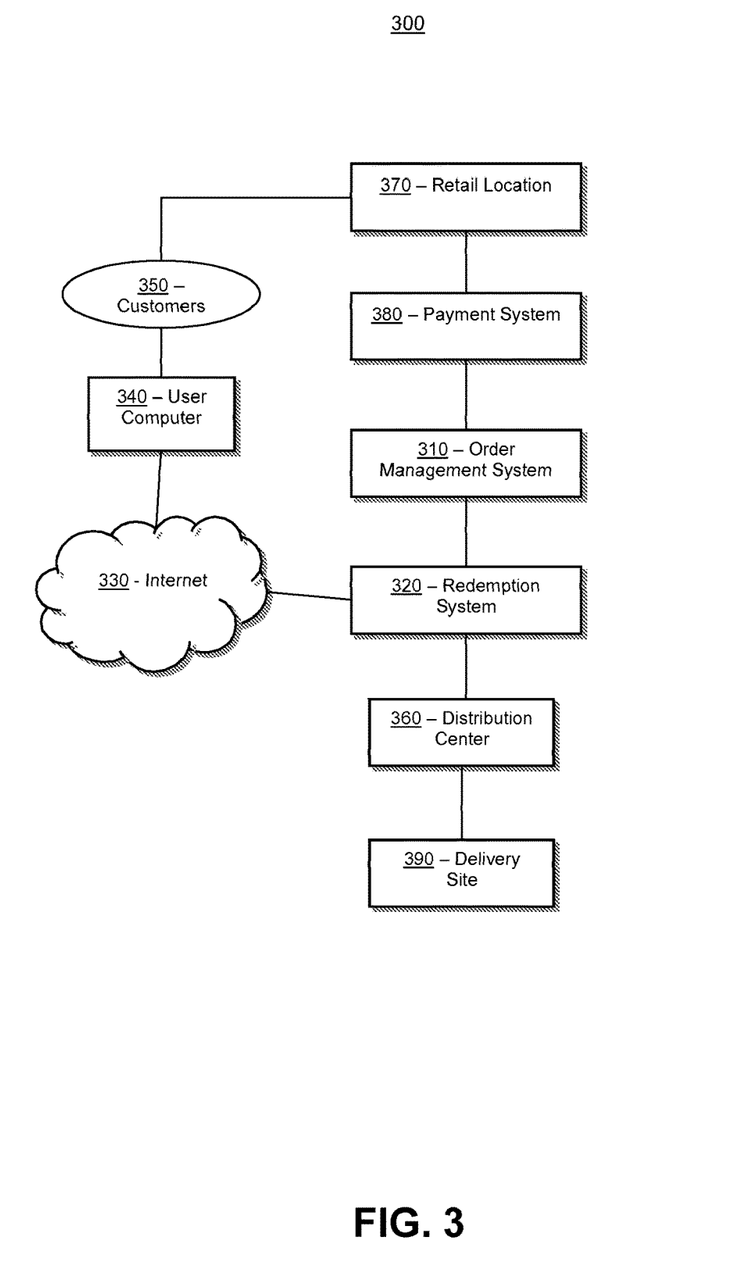
FIG. 3 illustrates a block diagram of an exemplary system for sales redemption, according to an embodiment.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 comprises chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM or DVD drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chip set (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Turning ahead in the drawings, FIG. 3 illustrates a block diagram of a system 300. System 300 is merely exemplary of a system in which a sale item can be redeemed and embodiments of the system and elements thereof are not limited to the embodiments presented herein.

In a number of embodiments, system 300 can include a payment system 380, an order management system 310, and a redemption system 320. Payment system 380, order management system 310, and redemption system 320 can each be a computer system, such as computer system 100 (FIG. 1), as described above, and can each be a single computer, a single server, or a cluster or collection of computers or servers, or a cloud of computers or servers. In another embodiment, all or part of the two or more of payment system 380, order management system 310, and redemption system 320 can be part of the same single computer, single server, or the same cluster or collection of computers or servers, or the same cloud of computers or servers. In various embodiments, payment system 380 can be at least partially located at a retail location 370, and redemption system 320 can be located at a different location. In many embodiments, payment system 380 can be at least partially part of a checkout system of retail location 370. For example, payment system 380 can be at least partially integrated with the point of sale system at retail location 370, or payment system 380 can be at least partially integrated with a mobile payment or checkout system.

In many embodiments, payment system 380 can be in data communication with redemption system 320 and/or order management system 310. In certain embodiments, payment system 380, order management system 310, and redemption system 320 can be separate systems. In other embodiments, payment system 380, order management system 310, and redemption system 320 can be a single system. In various embodiments, redemption system 320 can be in data communication through Internet 330 with user computers (e.g., 340). User computers 340 can be desktop computers, laptop computers, smart phones, tablet devices, and/or other end-point devices, which can allow customers (e.g., 350) to access redemption system 320 through Internet 330. In various embodiments, redemption system 320 can host one or more websites, such as through one or more web servers. For example, redemption system 320 can host an eCommerce website that can allow customers (e.g., 350) to redeem sale items and complete their order, in addition to other suitable activities by using their computer (e.g., 340).

In many embodiments, customer 350 can be present in retail location 370 during a sale. In some embodiments, the sale can be for a limited amount of time and/or for a limited selection of sale items. However, when a sale item is not available at retail location 370 during the sale, system 300 can allow customer 350 to purchase the sale item using payment system 380. In some embodiments, the sale item can be in stock, but customer 350 may be limited to only purchasing a certain number of the sale items. In these embodiments, customer 350 may be allowed to purchase additional sale items through payment system 380 and redeem the payment instrument for additional sale items later.

Figure 4:
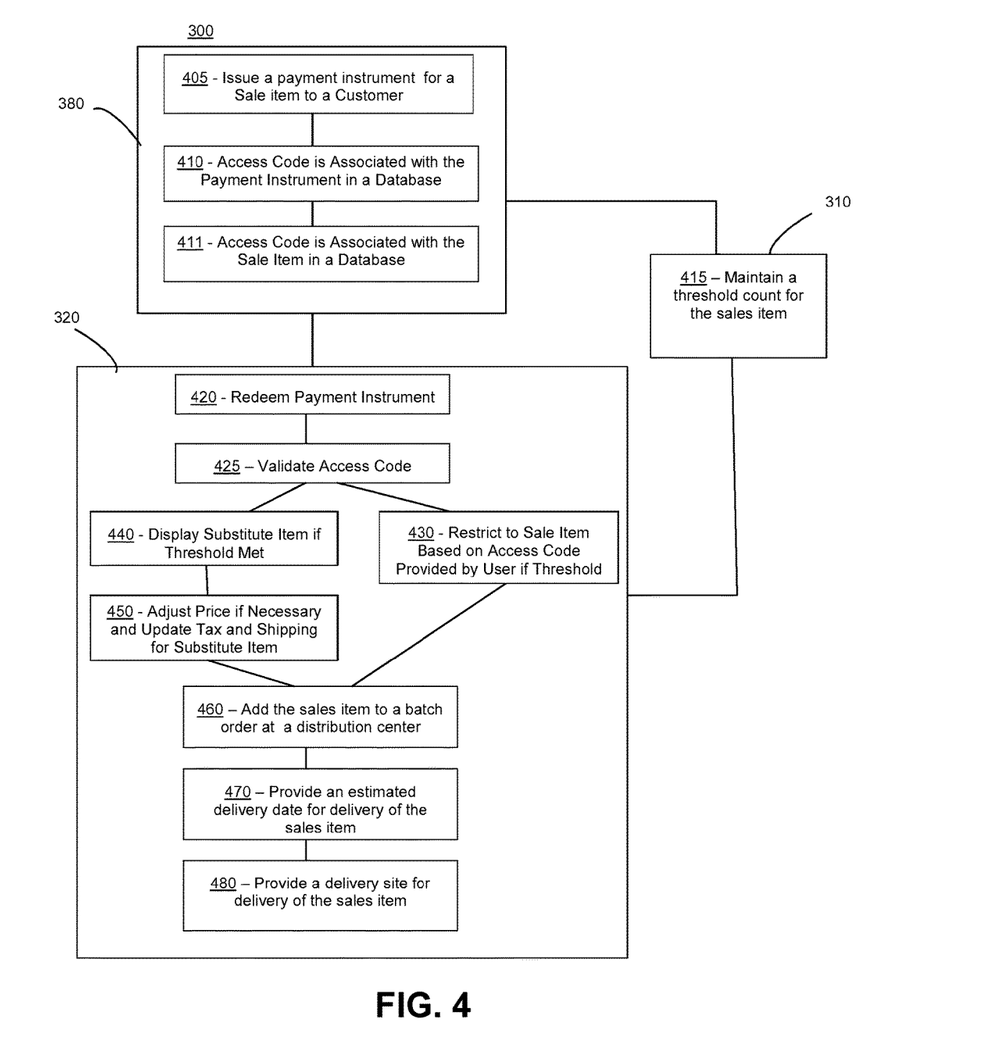
FIG. 4 illustrates a block diagram of an exemplary system, according an embodiment.

In some embodiments, payment system 380 can be configured to issue a payment instrument for a sale item to customer 350, as shown in block 405 in FIG. 4. In many embodiments, the payment instrument is issued to the customer in exchange for a guaranteed sale item. In some embodiments, returning to FIG. 3, customer 350 pays for the sale item and any taxes or other fees that may be necessary while in retail location 370 during the time of the sale. The payment system then issues the payment instrument to customer 350. The payment instrument can be a gift card, a virtual gift card, a prepaid card, a debit card, a credit card, a string on a receipt, or any other similar instrument. In some embodiments, customer 350 can be present in retail location 370 during the time of the sale in order to qualify to purchase the sale item. In some embodiments, customer 350 can purchase the sale item and receive the payment instrument at the point of sale terminals in retail location 370. In other embodiments, customer 350 can purchase the sale item and receive the payment instrument via a mobile device, while customer 350 is present in retail location 370. For example, customer 350 can use a cellphone to access or purchase the sale item through a website or a specialized application program ("app"). In some embodiments, the payment instrument can be a virtual gift card that customer 350 can receive through email, text message, or the app.

In some embodiments, system 300 restricts the payment instrument to the redemption of the sale item. In other embodiments, system 300 does not restrict the payment instrument to the redemption of the sale item, but allows the payment instrument to be used to purchase other items within retail location 370 or the company's website or eCommerce system. In some embodiments, payment system 380, in block 410 (FIG. 4), provides an access code associated with the payment instrument. In some embodiments, payment system 380, in block 411 (FIG. 4), can associate the access code with the sale item. In many embodiments, the access code can be associated with the payment instrument, the sale item, or both. In some embodiments, the association is maintained and/or stored in a database within system 300. In some embodiments, the access code can be used as a validation number or other identifier for the payment instrument. In some embodiments, the access code can be associated or linked to retail location 370, the sale item, and/or the payment instrument. In some embodiments, customer 350 cannot complete the transaction on redemption system 320 without the valid access code to authenticate the payment instrument.

In many embodiments, payment system 380 can communicate to order management system 310 when the payment instrument for the sale item has been issued. In some embodiments, order management system 310 can allocate or account for the sale item in the supply chain. Order management system 310 can maintain a threshold count for the sale item (block 415 (FIG. 4)). In many embodiments, payment system 380 provides the access code to order management system 310. Order management system 310 can then maintain a list of valid access codes. In some embodiments, order management system 310 can maintain the lists in databases. Order management system 310 can maintain counts and lists by storing data on its system memory or on other accessible memory. In some embodiments, order management system 310 can maintain a list of valid access codes, along with the associated sale item and payment instrument. In addition, order management system 310 also can maintain a list of access codes which have been redeemed. In many embodiments, access codes which have been redeemed are no longer valid. In other embodiments, access codes which have been redeemed once can be valid for an additional purchase of the sale item depending on availability.

In many embodiments, redemption system 320 can be configured to redeem the payment instrument (block 420 (FIG. 4)). In some embodiments, redeeming the payment instrument (block 420) can comprise a block 430 of restricting the redemption of the payment instrument to the sale item based on the access code provided by the user or customer 350 if the threshold count (block 415) has not been met. In some embodiments, redeeming the payment instrument (block 420) can comprise block 440 of displaying a substitute item if the threshold count (block 415) has been met. In some embodiments, redeeming the payment instrument (block 420), further comprises a block 450 of adjusting the price, if necessary, and updating the tax and shipping costs for the substitute item. In some embodiments, redemption system 320 can be a website accessed through a particular uniform resource location ("URL") for the particular limited sale. In many embodiments, the URL for redemption system 320 can be secured. In some embodiments, redemption system 320 can be accessed through an app. In some embodiments, redemption system 320 can be accessed through a phone number, computer operator, or live operator.

In some embodiments, redemption system 320 validates the access code (block 425 (FIG. 4)). In many embodiments, validating the access code confirms that the access code is valid and is associated with a particular sale item and payment instrument. In some embodiments, the access code can be a validation number or other identifier. The access code can be associated with retail location 370. In some embodiments, redemption system 320 validates the access code by comparing the access code against a list of valid access codes generated by order management system 310. In other embodiments, order management system 310 validates the access code by comparing the access code against a list of valid access codes and communicates to redemption system 320 if the access code is valid.

In many embodiments, when the access code has been validated and redeemed, redemption system 320 informs order management system 310 of the redemption of the access code. Order management system 310 can then remove the access code from the list of valid access codes. In some embodiments, order management system 310 can add the redeemed access code to a list of redeemed access codes.

In some embodiments, redemption system 320 can provide a confirmation to customer 350 to confirm that the sale item related to the access code is correct. When the sale item related or associated with the access code is not correct, redemption system 320 can allow customer 350 to input the access code again. In some embodiments, redemption system 320 can allow customer 350 to input the access code only for a limited number of times. In many embodiments, customer 350 can be locked out of the limited time sale website if customer 350 has too many failed attempts. In some embodiments, too many failed attempts can be more than three failed attempts, while in in other embodiments, too many failed attempts can be more than five failed attempts. In many embodiments, redemption system 320 can provide a help or assistance phone number, website, chat room, and/or email address.

Order management system 310 also can maintain a threshold count for the sale item. In some embodiments, when the threshold count reaches a determined limit, redemption system 320 can provide a substitute item to customer 350. In some embodiments, the threshold count can be set to approximately 80 percent of the total number of the sale item associated with an access code. In other embodiments, the threshold count can be set to approximately 60 percent of the total number of the sale item associated with an access code. In some embodiments, the substitute item can be similar to the sale item. In other embodiments, the substitute item can be any item from the same limited time sale. In still other embodiments, the substitute item can be any item from a later limited time sale. In some embodiments, a refund can be offered to customer 350.

In various embodiments, redemption system 320 provides a delivery site (e.g., 390) to customer 350 and/or others for delivery of the sale item (block 480 (FIG. 4). Redemption system 320 can default the delivery site (e.g., 390) to retail location 370, and/or in some embodiments, redemption system 320 can allow customer 350 to select an alternative delivery site. In some embodiments, the access code can be used to inform redemption system 320 of retail location 370. In other embodiments, the payment instrument can be used to inform redemption system 320 of retail location 370. In some embodiments, the alternative delivery site can result in an increase in shipping costs, taxes, or other fees. In these embodiments, redemption system 320 can provide a notice of a change of cost when the customer selects the alternative delivery site. Redemption system 320 can also provide a checkout system for customer 350 to pay for the change of cost when customer 350 selects an alternative delivery site.

In many embodiments, when customer 350 finalizes the redemption, redemption system 320 can add, or communicate to the order management system to add, the sale item to a batch order at a distribution center (block 460 (FIG. 4)). Redemption system 320 can also provide an estimated delivery date for the sale item to customer 350 and/or others (block 470). In some embodiments, the sale item can be guaranteed to be delivered by a certain date. For example, during a Thanksgiving or Black Friday sale, system 300 can guarantee delivery of the sale item before Christmas. In some embodiments, customer 350 can pay extra to receive the sale item sooner than the guaranteed delivery date. Redemption system 320 can also provide a checkout system for customer 350 to pay for the change of cost when customer 350 selects an alternative delivery date.

In some embodiments, redemption system 320 can be further configured to provide customer 350 with an option to purchase an add-on. For example, the add-on can be a customer care plan, a warranty for the sale item, an accessory for the sale item, and/or another sale item. In some embodiments, redemption system 320 can be further configured to allow customer 350 to purchase other sale items which were available in the same limited time sale as the sale item that customer 350 previously purchased. The information regarding the limited time sale and the items available during that sale can be maintained in system 300 and communicated to redemption system 320. If customer 350 purchases any additional item, redemption system 320 can be configured to communicate the newly purchased item(s) to order management system 310. In some embodiments, redemption system 320 can be configured to disable an option to shop for more items. In some embodiments, redemption system 320 can provide customer 350 with a link to shop for more items. In some embodiments, a link with cross-sell items or other offers can be provided to customer 350.

Figure 5:
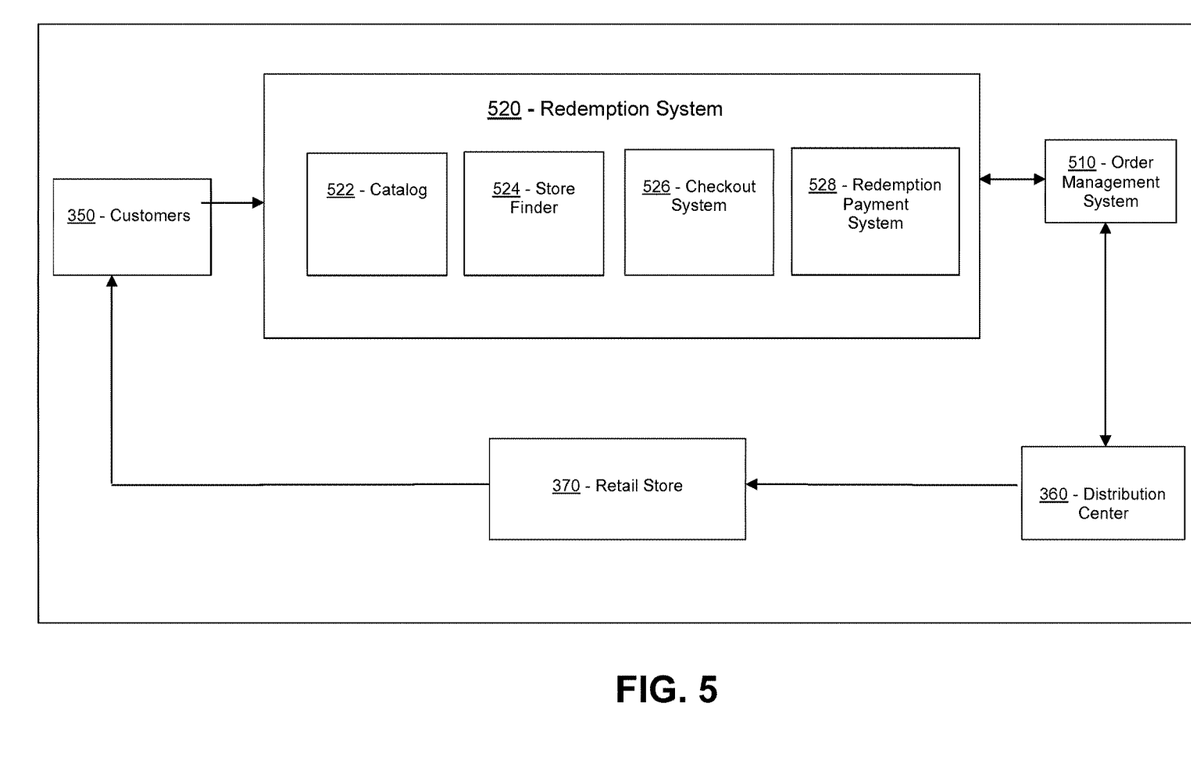
FIG. 5 illustrates a block diagram of an exemplary system according to another embodiment.

FIG. 5 illustrates another embodiment of system 300. Redemption system 520 is similar to redemption system 320 (FIG. 3). Order management system 510 is similar to order management system 310 (FIG. 3). In some embodiments, redemption system 520 comprises a catalog 522, a store finder 524, a checkout system 526, and a redemption payment system 528. In many embodiments, catalog 522 comprises listings of all the sale items and unique prices available at each retail location during the limited time sale. In some embodiments, catalog 522 comprises listings of all sale items available during the limited time sale, substitute items, and available add-ons and associated unique prices at each retail location. In many embodiments, redemption system 520 can compare the payment instrument to the price of the sale item in the catalog and verify any amount due against the payment instrument. In some embodiments, store finder 524 can be used to populate the default delivery site (e.g., 390 (FIG. 3) based on the access code entered by customer 350. In some embodiments, customer 350 can use store finder 524 to select an alternative delivery site.

In various embodiments of redemption system 520, checkout system 526 can be used in the redemption of the sale item. In some embodiments, checkout system 526 can be used to provide customer 350 with one or more substitute items, accessories or other add-ons, change of delivery site, and change of delivery date. In some embodiments, when customer 350 has made selections which change the cost, redemption payment system 528 can be presented to customer 350. Redemption payment system 528 can allow customer 350 to pay the difference using a gift card, a credit card, a debit card, or other payment methods.

In some embodiments, order management system 510 can be in communication with redemption system 520 and distribution center 360. In various embodiments, order management system 510 can assist redemption system 520 with access code validation by storing or maintaining a list or database of valid access codes. In some embodiments, order management system 510 can maintain a list of active valid access codes, and in some embodiments order management system 510 can maintain a list of used access codes. In many embodiments, order management system 510 accounts for the sale of an item in the supply chain when customer 350 purchases a payment instrument. Order management system 510 can then maintain a threshold count according to a determined threshold number and communicate to redemption system 520 when the threshold has been reached. Once the threshold has been reached, redemption system 520 can offer a substitute item for the sale item. In some cases, the substitute item will be offered for the same price paid in the payment instrument. In other embodiments, the substitute item may offer a refund and/or require a price adjustment.

Figure 6:
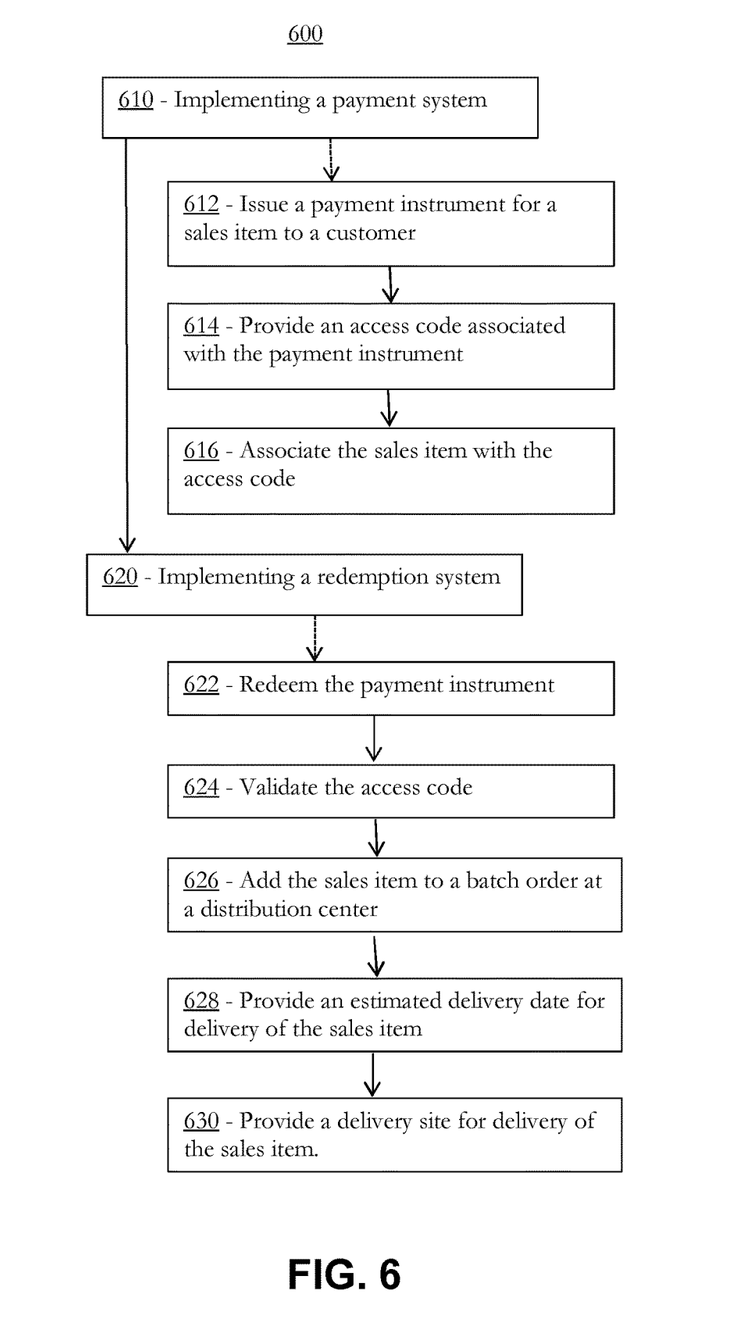
FIG. 6 illustrates a method for sale redemption, according to an embodiment.

FIG. 6 illustrates a method 600 for sales redemption according to an embodiment. In some embodiments, method 600 comprises block 610 of implementing a payment system, such as payment system 380 of FIG. 3 and FIG. 4, and block 620 of implementing a redemption system, such as redemption system 320 of FIGS. 3-4 and/or redemption system 520 of FIG. 5. In some embodiments, the payment system is at least partially located at the retail location and the redemption system is located at a different location. In some embodiments, the payment system and the redemption system can both be located at the same location. In many embodiments, block 610 can comprise implementing the payment system to issue a payment instrument for a sale item to a customer (block 612), provide an access code associated with the payment instrument (block 614), and associate the sale item with the access code (block 616).

In some embodiments, the sale item is not available or is not in stock at a retail location. In some embodiments, the method can further comprise implementing the payment system to provide the access code to an order management system. In many embodiments, the method can further comprise implementing the payment system to communicate to the order management system when the payment instrument for the sale item has been issued. In various embodiments, the order management system can maintain a threshold count for the sale item. The redemption system can provide or offer a substitute item when the threshold count reaches a determined limit.

In many embodiments, block 620 of implementing a redemption system can comprise the blocks of redeeming the payment instrument (block 622), such as block 420 of FIG. 4, validating the access code (block 624), adding the sale item to a batch order at a distribution center (block 626), such as distribution center 360 of FIG. 3 and FIG. 5, providing an estimated delivery date for delivery of the sale item (block 628), and providing a delivery site for delivery of the sale item (block 630), such as delivery site 390 of FIG. 3. In some embodiments, the redemption system defaults the delivery site to the retail location from where the payment instrument was issued. In other embodiments, the redemption system can allow the customer, such as customer(s) 350 in FIGS. 3 and 5, to select an alternative delivery site. For example, the customer can select to have the sale item shipped to an alternative retail location or to the customer's business or home address. When the customer selects the alternative delivery site, the redemption system can provide a notice of any change of costs of the alternative delivery site. For example, the delivery price may increase if the customer selects the customer's home address as the alternative delivery location. In many embodiments, the redemption system can provide a checkout system for the customer to pay for the change of cost when the customer selects the alternative delivery site.

In many embodiments, the redemption system can also be implemented for providing an option for the customer to purchase a customer care plan and a warranty for the sale item. In some embodiments, the redemption system can provide an option for the customer to purchase other add-ons, such as an accessory item. When the customer chooses the option to purchase another item, such as the warranty for the sale item or an accessory, the redemption system can provide a notice of any change of costs for the additional items. In many embodiments, the redemption system can provide a checkout system for the customer to pay for the additional item. In some embodiments, implementing the redemption system can further comprise disabling an option to shop for more items. In some embodiments, the redemption system can provide a link for the customer to shop for more items.

In many embodiments, implementing the redemption system in block 620 can further comprise validating the access code against a valid access code list generated by the order management system. In some embodiments, the valid access code list generated by the order management system can be a valid access code list maintained or stored by the order management system. Implementing the redemption system in block 620 can further comprise informing the order management system of the redemption of the access code. In many embodiments, the order management system can be implemented to remove the access code from the valid access code list.

Although systems and methods for sales redemption has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, activities, or modules of FIGS. 4 and 5 may include different procedures, processes, and/or activities and be performed by many different modules, in many different orders. As another example, the modules within payment system 380 in FIG. 4 can be interchanged or otherwise modified.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
memory storing one or more programs to be executed by the one or more processors, the one or more programs comprising instructions for:
a payment system configured to:
issue a payment instrument for a sale item to a customer shopping in a brick and mortar store or on a website of a retail merchant, when the sale item is not in stock (a) at the brick and mortar store or (b) on the website of the retail merchant;
provide an access code to an order management system, wherein the order management system is configured to link the access code with the sale item and the payment instrument to permit the retail merchant to authenticate the payment instrument when the customer redeems the payment instrument for the sale item;
and
a redemption system configured to:
redeem the payment instrument at the brick and mortar store when the sale item is available (a) at the brick and mortar store or (b) on the website;
authenticate the access code of the payment instrument by comparing the access code with a list of valid access codes stored on the order management system, wherein:
when the redemption system authenticates the access code as valid, the redemption system is configured to instruct the order management system to automatically remove the access code from the list of valid access codes; and
when the redemption system cannot authenticate the access code after a predetermined number of attempts, the redemption system is configured to prevent further use of the access code and require intervention by a representative of the retail merchant;
purchase or add the sale item, as redeemed, to an order;
provide an estimated delivery date for delivery of the sale item;
provide a delivery site for the delivery of the sale item;
default the delivery site to the brick and mortar store;
permit the customer to select an alternative delivery site;
provide a notice of an increase in cost for the sale item responsive to the customer selecting the alternative delivery site; and
provide a checkout system for the customer to pay for the increase in the cost for the sale item when the customer selects the alternative delivery site,
wherein:
the payment system is further configured to communicate to the order management system when the payment instrument for the sale item has been issued;
the payment system is further configured to adjust a total cost of the sale item for tax and shipping costs for the delivery;
the order management system is further configured to maintain a threshold count for the sale item;
the redemption system is further configured to provide a substitute item when the threshold count reaches a predetermined lower limit or provide a link to the website of the retail merchant to shop for additional items;
the threshold count is a percentage of a total number of the sale item;
the redemption system is further configured to:
provide an option to purchase at least one of a customer care plan or a warranty for the sale item;
provide a link to the website of the retail merchant to shop for cross-sell items related to the sale item;
host an eCommerce website to permit customers shopping on the eCommerce website to redeem the payment instrument when the sale item is available on the eCommerce website;
the payment system is at least partially located at the brick and mortar store; and
the redemption system is at least partially located at a different location than the brick and mortar store.

2. The system of claim 1, wherein:
the redemption system is further configured to disable an option to shop for more items.

3. The system of claim 1, wherein the payment instrument comprises a debit card.

4. The system of claim 1, wherein the payment instrument comprises a credit card.

5. The system of claim 1, wherein the payment instrument comprises a gift card.

6. The system of claim 1, further comprising a specialized application program ("app") user interface on a mobile device of the customer configured to permit the customer to (a) purchase a sale item remotely and (b) receive the payment instrument via the mobile device.

7. The system of claim 1, wherein the payment system is further configured to restrict the payment instrument to a redemption of the sale item.

8. The system of claim 1, wherein the payment system is further configured to permit the payment instrument to be used to purchase items other than the sale item (a) within the brick and mortar store or (b) on the website.

9. The system of claim 1, wherein the access code is associated with a particular brick and mortar store.

10. The system of claim 1, wherein the redemption system is configured to transmit a confirmation that the sale item matches the access code.

11. A method being implemented via execution of computing instructions configured to run at one or more processors and stored at one or more non-transitory computer-readable media, the method comprising:
  issuing, with a payment system, a payment instrument for a sale item to a customer shopping in a brick and mortar store or on a website associated with a retail merchant, when the sale item is not in stock (a) at the brick and mortar store or (b) on the website of the retail merchant;
  providing, with the payment system, an access code to an order management system, wherein the order management system is configured to link the access code with the sale item and the payment instrument to permit the retail merchant to authenticate the payment instrument when the customer redeems the payment instrument for the sale item;
  redeeming, with a redemption system, the payment instrument at the brick and mortar store when the sale item is available (a) at the brick and mortar store or (b) on the website;
  authenticating, with the redemption system, the access code of the payment instrument by comparing the access code with a list of valid access codes stored on the order management system, wherein:
    when the redemption system authenticates the access code as valid, the redemption system is configured to instruct the order management system to automatically remove the access code from the list of valid access codes; and
    when the redemption system cannot authenticate the access code after a predetermined number of attempts, the redemption system is configured to prevent further use of the access code and require intervention by a representative of the retail merchant;
  purchasing or adding, with the redemption system, the sale item, as redeemed, to an order;
  providing, with the redemption system, an estimated delivery date for delivery of the sale item;
  providing, with the redemption system, a delivery site for the delivery of the sale item, wherein:
    the redemption system is configured:
      default the delivery site to the brick and mortar store;
      permit the customer to select an alternate delivery site;
      provide a notice of an increase in cost for the sale item responsive to the customer selecting the alternate delivery site; and
      provide a checkout system for the customer to pay for the increase in the cost for the sale item when the customer selects the alternative delivery site, wherein:
  the payment system is further configured to communicate to the order management system when the payment instrument for the sale item has been issued;
  the payment system is further configured to adjust a total cost of the sale item for tax and shipping costs for the delivery;
  the order management system is further configured to maintain a threshold count for the sale item;
  the redemption system is further configured to provide a substitute item when a threshold count reaches a predetermined lower limit or provide a link to the website of the retail merchant to shop for additional items;
  the threshold count is a percentage of a total number of the sale item;
  the redemption system is further configured to:
    provide an option to purchase at least one of a customer care plan or a warranty for the sale item;
    provide a link to the website of the retail merchant to shop for cross-sell items related to the sale item;
    host an eCommerce website to permit customers shopping on the eCommerce website to redeem the payment instrument when the sale item is available on the eCommerce website;
  the payment system is at least partially located at the brick and mortar store; and
  the redemption system is at least partially located at a different location than the brick and mortar store.

12. The method of claim 11, wherein
the redemption system is further configured to disable an option to shop for more items.

13. The method of claim 11, wherein the payment instrument comprises a debit card.

14. The method of claim 11, wherein the payment instrument comprises a credit card.

15. The method of claim 11, wherein the payment instrument comprises a gift card.

16. The method of claim 11, wherein the redemption system further comprising a specialized application program ("app") user interface on a mobile device of the customer configured to permit the customer to (a) purchase a sale item remotely and (b) receive the payment instrument via the mobile device.

17. The method of claim 11, wherein the payment system is further configured to restrict the payment instrument to redemption of the sale item.

18. The method of claim 11, wherein the payment system is further configured to permit the payment instrument to be used to purchase other items other than the sale item (a) within the brick and mortar store or (b) on the website.

19. The method of claim 11, wherein the access code is associated with a particular brick and mortar store.

20. The method of claim 11, wherein the redemption system further is configured to transmit a confirmation that the sale item matches the access code.

* * * * *